(12) United States Patent
Hickey et al.

(10) Patent No.: US 11,531,644 B2
(45) Date of Patent: Dec. 20, 2022

(54) FRACTIONAL CONSISTENT GLOBAL SNAPSHOTS OF A DISTRIBUTED NAMESPACE

(71) Applicant: EMC IP Holding Company LLC, Hopkinton, MA (US)

(72) Inventors: Charles J. Hickey, Aptos, CA (US); Murthy V. Mamidi, San Jose, CA (US); Geetha Shendge, Hopkinton, MA (US); Sai Chivukula, Fremont, CA (US); Xiaohong W. Wang, Cupertino, CA (US); George Mathew, Belmont, CA (US); Abhishek Rajimwale, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/070,563

(22) Filed: Oct. 14, 2020

(65) Prior Publication Data
US 2022/0114139 A1    Apr. 14, 2022

(51) Int. Cl.
*G06F 16/11*        (2019.01)
*G06F 16/182*       (2019.01)

(52) U.S. Cl.
CPC .......... *G06F 16/128* (2019.01); *G06F 16/182* (2019.01)

(58) Field of Classification Search
CPC .............................. G06F 16/128; G06F 16/182
See application file for complete search history.

(56) References Cited

U.S. PATENT DOCUMENTS

| | | | | |
|---|---|---|---|---|
| 5,835,953 A * | 11/1998 | Ohran | ................. | G06F 11/1466 711/162 |
| 7,127,577 B2 * | 10/2006 | Koning | ................... | G06F 16/10 714/E11.125 |
| 7,577,817 B2 * | 8/2009 | Karpoff | ................. | G06F 3/0605 711/170 |
| 7,680,996 B2 * | 3/2010 | Komarov | .............. | G06F 16/128 711/168 |
| 7,734,591 B1 * | 6/2010 | Mercier | ............. | G06F 11/1466 707/639 |
| 7,769,722 B1 * | 8/2010 | Bergant | ............. | G06F 11/2097 707/681 |
| 9,189,495 B1 * | 11/2015 | Hughes | ................. | G06F 16/128 |
| 9,384,199 B2 * | 7/2016 | Thereska | ............. | H04L 63/205 |
| 9,558,073 B2 * | 1/2017 | Cantwell | ............ | G06F 16/9027 |
| 9,886,346 B2 * | 2/2018 | Kumarasamy | ...... | G06F 11/1451 |
| 10,423,609 B1 * | 9/2019 | Strauss | ................ | G06F 16/128 |
| 10,579,593 B2 * | 3/2020 | Bassov | ................. | G06F 3/0683 |
| 11,163,721 B1 * | 11/2021 | Mahuli | .................. | G06F 16/16 |
| 2005/0033929 A1 * | 2/2005 | Burton | ................. | G06F 16/128 711/162 |

(Continued)

*Primary Examiner* — Robert W Beausoliel, Jr.
*Assistant Examiner* — Susan F Rayyan
(74) *Attorney, Agent, or Firm* — Womble Bond Dickinson (US) LLP

(57) ABSTRACT

A method of capturing a fractional snapshot of a distributed file system includes receiving a snapshot request to generate a factional snapshot of a file system. The request includes an indication of a subset of data of the file system. The method further includes identifying, by a processing device, the subset of data of the file system indicated by the snapshot request and generating the fractional snapshot comprising the subset of data of the file system indicated by the snapshot request.

20 Claims, 7 Drawing Sheets

(56) References Cited

U.S. PATENT DOCUMENTS

| | | | |
|---|---|---|---|
| 2005/0091461 A1* | 4/2005 | Kisley | G06F 16/10 711/173 |
| 2006/0271604 A1* | 11/2006 | Shoens | G06F 16/128 |
| 2007/0156794 A1* | 7/2007 | Kisley | G06F 16/00 |
| 2009/0055604 A1* | 2/2009 | Lemar | G06F 11/1435 711/161 |
| 2011/0161299 A1* | 6/2011 | Prahlad | G06F 16/128 707/649 |
| 2011/0282841 A1* | 11/2011 | Saika | G06F 3/0613 707/649 |
| 2013/0006936 A1* | 1/2013 | Chen | G06F 16/273 707/639 |
| 2013/0311735 A1* | 11/2013 | Sivakumar | G06F 3/067 711/162 |
| 2014/0089264 A1* | 3/2014 | Talagala | G06F 3/065 707/649 |
| 2014/0149698 A1* | 5/2014 | Ezra | G06F 12/0864 711/162 |
| 2014/0258613 A1* | 9/2014 | Sampathkumar | G06F 11/1469 711/114 |
| 2015/0066857 A1* | 3/2015 | Dayal | G06F 16/128 707/639 |
| 2016/0019002 A1* | 1/2016 | Kurtin | G06F 3/0665 711/162 |
| 2016/0335174 A1* | 11/2016 | Amichai | G06F 11/30 |
| 2017/0006188 A1* | 1/2017 | Amichai | H04N 5/3454 |
| 2017/0097785 A1* | 4/2017 | Bhoomaraddi | G06F 11/1451 |
| 2017/0206212 A1* | 7/2017 | Srivilliputtur Mannarswamy | G06F 3/064 |
| 2017/0323110 A1* | 11/2017 | Griffith | G06F 11/366 |
| 2017/0371750 A1* | 12/2017 | Horowitz | H04L 67/1097 |
| 2018/0314749 A1* | 11/2018 | Raja | G06F 11/1458 |
| 2019/0179918 A1* | 6/2019 | Singh | G06F 11/1461 |
| 2019/0213123 A1* | 7/2019 | Agarwal | G06F 16/188 |
| 2020/0125531 A1* | 4/2020 | Troshin | G06F 16/9038 |
| 2020/0134040 A1* | 4/2020 | Christensen | G06F 16/182 |
| 2020/0241756 A1* | 7/2020 | Lee | G06F 3/065 |
| 2020/0241757 A1* | 7/2020 | Lee | G06F 3/067 |
| 2022/0027185 A1* | 1/2022 | Wang | G06F 11/1469 |

* cited by examiner

300

```
┌─────────────────────────────────────────────────┐
│  Receive a snapshot request to generate a fractional │ ─── 310
│  snapshot of a file system, the request including an │
│  indication of a subset of data of the file system.  │
└─────────────────────────────────────────────────┘
                         │
                         ▼
┌─────────────────────────────────────────────────┐
│  Identify the subset of data of the file system indicated by │ ─── 320
│  the snapshot request.                          │
└─────────────────────────────────────────────────┘
                         │
                         ▼
┌─────────────────────────────────────────────────┐
│  Generate the fractional snapshot including the subset of │ ─── 330
│  data of the file system indicated by the snapshot request. │
└─────────────────────────────────────────────────┘
```

FIG. 3

FRACTIONAL CONSISTENT GLOBAL SNAPSHOTS OF A DISTRIBUTED NAMESPACE

FIELD OF THE INVENTION

Embodiments of the present invention relate generally to data storage systems. More particularly, embodiments of the invention relate to fractional consistent global snapshots of a distributed name space.

BACKGROUND

A file system snapshot is a mechanism for providing a static view of an active file system at a specific point in time. Particularly, snapshots are used for file system roll-back, detecting changes of the file system between points in time, and for facilitating moves of data (e.g., to and from cloud based archives). A distributed namespace is a grouping of shared folders located on different servers or storage devices into one or more logically structured namespaces. Thus, folders distributed throughout a distributed file system may be accessed via a distributed namespace. A full global snapshot of a distributed namespace is a snapshot of the entire distributed namespace, including all files and data included within the distributed namespace.

BRIEF DESCRIPTION OF THE DRAWINGS

Embodiments of the invention are illustrated by way of example and not limitation in the figures of the accompanying drawings in which like references indicate similar elements.

FIG. 3 is a flow diagram illustrating an example method of creating a fractional snapshot according to one embodiment of the disclosure.

DETAILED DESCRIPTION

Figure 1:
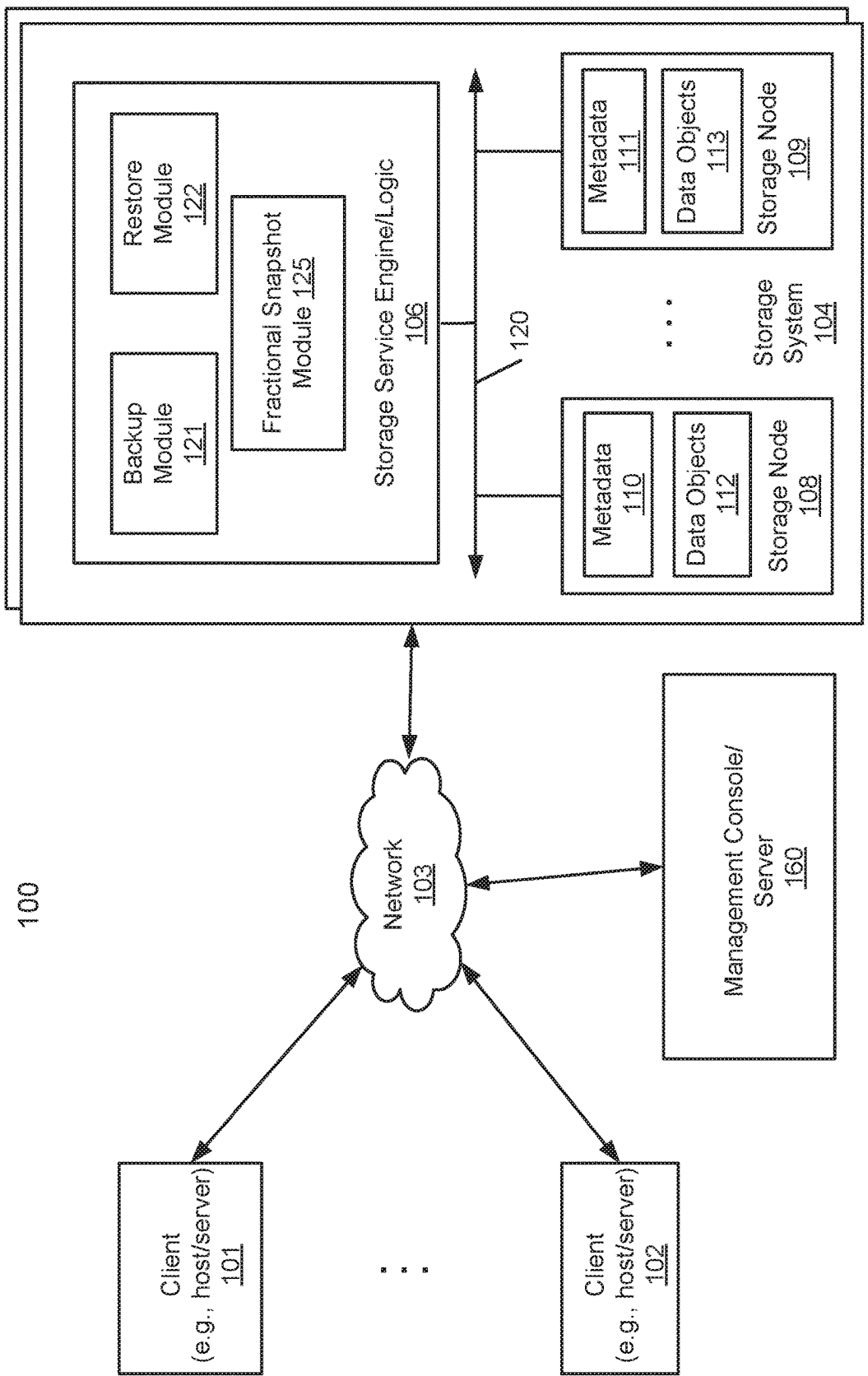
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In many instances, a full global snapshot of a distributed namespace within a distributed file system may be highly inefficient. For example, many applications of snapshots may not require a full snapshot of a file system namespace and may only need to preserve a portion of the data in the file system namespace. A traditional full global snapshot does not consider whether less than the entire namespace should be persisted. Therefore, the full global snapshot may persist the entire file system namespace despite the actual needs for the snapshot. This results in an unnecessary use of computer resources, and in the case of distributed networks of storage nodes, excessive network traffic. Furthermore, a full global snapshot may fail if any of the nodes of the namespace are unavailable.

The present disclosure addresses the issues with full global snapshots of a file system by providing for fractional consistent snapshots of a distributed namespace. A fractional snapshot may be a snapshot consisting of a subset of the data present in a full global snapshot of a file system. For example, a request to a file manager to create a fractional snapshot may include a list of file set identifiers (herein referred to as "collection partitions") of a file system to be included in the fractional snapshot. The collection partitions may identify a subset of all file sets of the file system. The file sets may be distributed across one or more storage nodes. The list of collection partitions may indicate both the file set and the storage location (e.g., storage node and disk location) of the file sets so that the snapshot may be performed for each file set in the list. At times, storage nodes of the file system may be unavailable. In such a case, to perform the fractional snapshot, the file manager may determine which storage nodes, and accordingly, which file sets are available for the snapshot and only perform the snapshot on the available file sets. The file manager may also remove snapshots and perform fractional snapshot recovery, as described in more detail with respect to FIGS. 2-5 below.

Therefore, fractional snapshots may save significant compute resources, increase system performance, and improve system reliability. Fractional snapshots consist of less data than a full snapshot and therefore requires less disk space for data storage, fewer compute resources, and less network bandwidth during construction. File operations may continue to storage nodes that are not participating in the fractional snapshot, resulting in better system performance. Finally, rollback checkpoint snapshot generation may proceed even when a storage node is offline resulting in increased system reliability.

In one embodiment, a method of generating a fractional snapshot includes receiving a snapshot request to generate a fractional snapshot of a file system. The snapshot request includes an indication of a subset of data of the file system. The method further includes identifying the subset of data of the file system indicated by the snapshot request and generating the fractional snapshot including the subset of data of the file system indicated by the snapshot request.

In one embodiment, the file system includes one or more file sets and wherein the fractional snapshot comprises a subset of the one or more file sets. In one embodiment, the indication of the subset of data includes a list of storage objects, each storage object identifying a data node and storage location of a file set to be included in the fractional snapshot.

In one embodiment, the method further includes receiving a request to remove the fractional snapshot, determining the file sets included in the fractional snapshot, and removing the fractional snapshot for each of the file sets of the fractional snapshot. In one embodiment, generating the fractional snapshot includes determining whether each of the file sets are available, and generating the fractional snapshot with the file sets that are available. In one embodiment, generating the fractional snapshot includes determining whether each of the file sets have been modified since a last snapshot, and generating the fractional snapshot on file sets that have been modified. In one embodiment, the file system comprises a meta node and one or more data nodes, and wherein the fractional snapshot is generated for a subset of the one or more data nodes.

In one embodiment, a system includes a memory and a processing device operatively coupled to the memory to perform operations including receiving a snapshot request to generate a fractional snapshot of a file system, the snapshot request including an indication of a subset of data of the file system, identifying the subset of data of the file system indicated by the snapshot request, and generating the fractional snapshot including the subset of data of the file system indicated by the snapshot request.

In one embodiment, a non-transitory machine-readable medium having instructions stored therein, which when executed by a processor, cause the processor to perform one or more operations, the operations including receiving a snapshot request to generate a fractional snapshot of a file system, the snapshot request including an indication of a subset of data of the file system, identifying the subset of data of the file system indicated by the snapshot request, and generating the fractional snapshot including the subset of data of the file system indicated by the snapshot request.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic, and one or more storage nodes or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage nodes 108-109. Restore logic 122 is configured to retrieve and restore backup data from any one or more of storage nodes 108-109 back to a client (e.g., clients 101-102).

In one embodiment, service engine/logic 106 may include a fractional snapshot module 125. Fractional snapshot module 125 may create fractional snapshots of a global namespace of a file system. For example, fractional snapshot module 125 may identify a sub-set of the data stored in a file system and generate a snapshot of the sub-set of the data rather than a full snapshot of the entire file system. The sub-set of data may be a collection of file sets that are identified by a snapshot request that is received from management console 160. The snapshot request may be provided automatically via an automated snapshot and backup systems or from an administrator accessing the storage system through the management console 160.

In one example, a data domain file system (DDFS) may include manageable file sets, referred to herein as "MTrees." An MTree may include a set of files in a self-contained file set referred to as a collection partition. The fractional snapshot request may include a list of collection partitions of the file system to be included in the snapshot. The fractional snapshot module 125 may receive the request with the list of collection partitions, determine whether the storage nodes (e.g., storage nodes 108-109) are available, and create a fractional snapshot of the collection partitions identified in the list. The fractional snapshot may include data objects 112-113 and metadata 110-111 of the file system that is included in the collection partitions list.

Storage nodes 108-109 may be implemented locally (e.g., single node operating environment) or remotely (e.g., multi-node operating environment) via interconnect 120, which may be a bus and/or a network (e.g., a storage network or a network similar to network 103). Storage nodes 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage nodes 108-109 may be located locally or remotely accessible over a network.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Figure 2A:
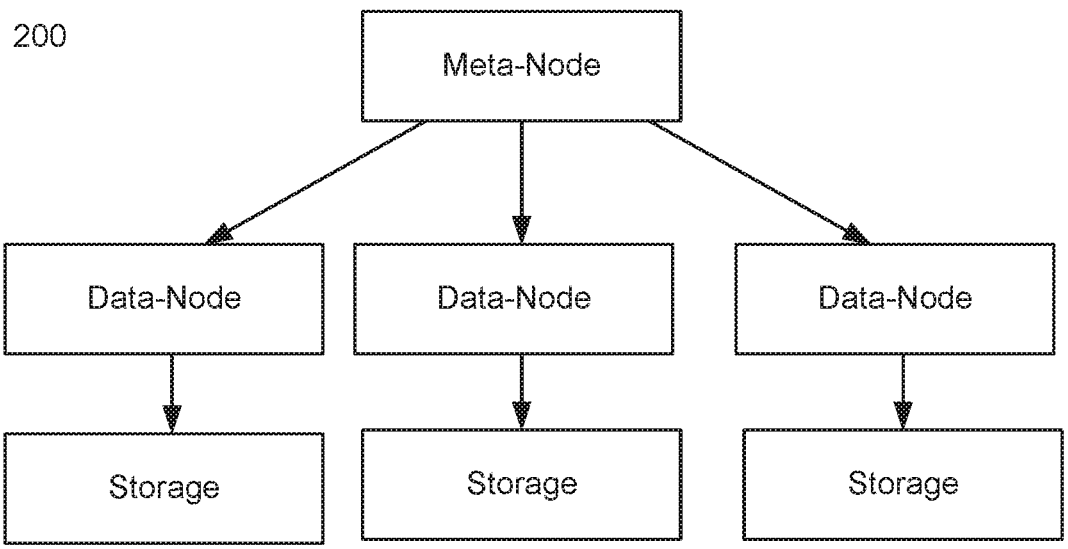
FIG. 2A is a block diagram illustrating an example file system namespace structure, according to one embodiment of the invention.

FIG. 2A is an example file system namespace 200 according to some embodiments. As depicted, the file system namespace 200 may include a meta-node comprising meta-data for the file system. The meta-node may include pointers to data-nodes of the file system namespace 200. The data-nodes may include pointers to the actual locations in storage where data of a file is stored. For example, meta-node may be a meta M-Tree comprising pointers to each of the data-nodes. Each of the data-nodes may be shadow M-Trees that include pointers to each of the corresponding storage locations in storage for each file of the shadow M-Tree.

An M-Tree may be a tree type data structure comprised of a root, one or more intermediate nodes, and several leaf nodes. An M-Tree may be constructed using a particular metric and may be searchable via range and k-th nearest neighbor queries or other queries. It should be noted that the file system namespace 200 structure may be any type of file system structure. In one embodiment, the data nodes (e.g., M-Trees) may be distributed across several storage nodes, such as a cluster of storage nodes, data centers, or other distributed storage.

In one embodiment, each of the data-nodes may include several leaf nodes referred to as "inodes" comprising meta-data for a file or data block and a pointer to the associated file or data block in storage (e.g., a block map). Upon making changes to a file, the file system may generate a new file and a new pointer to the new file in the data-node (e.g., in a shadow M-Tree). After creation of the new file, the file system may maintain the old file comprising the original data and a new file that includes the changes. Generally, a garbage collection operation may be performed periodically to remove the old file and the old pointer in the data-node to the old file. However, when a snapshot is performed, the old file and the old pointer to the file is maintained rather than being garbage collected. Therefore, the state at the point in time that the snapshot is created can be persisted based on the state of the file system namespace 200 at the time of the snapshot.

Figure 2B:
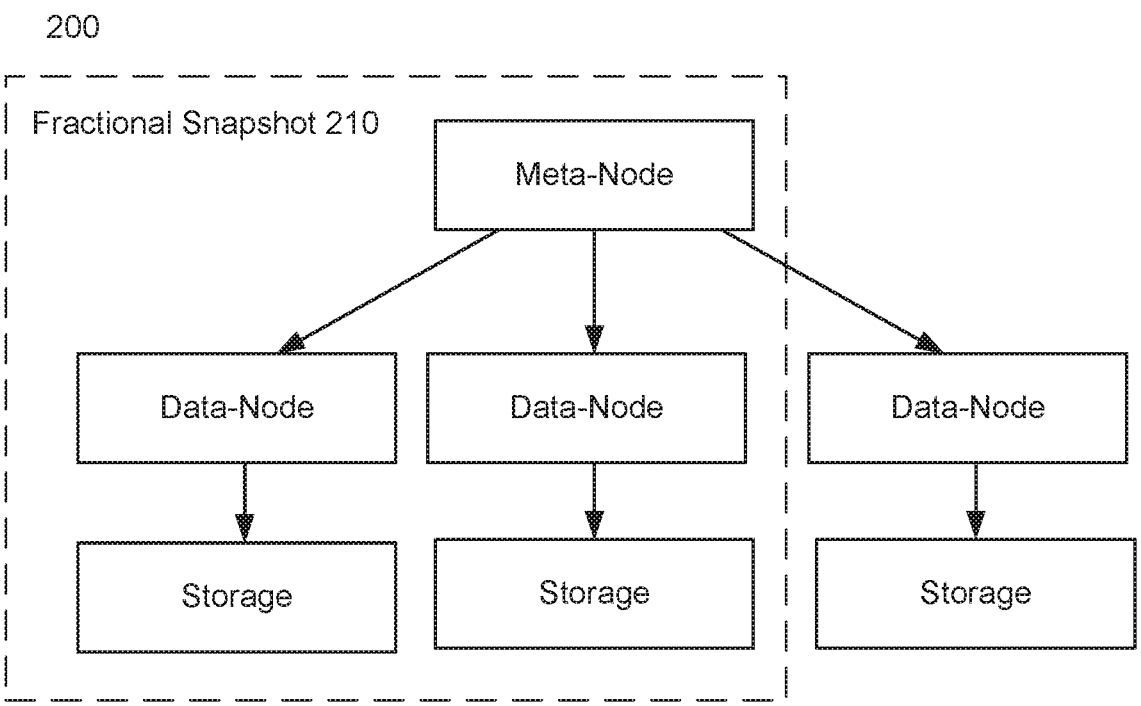
FIG. 2B is a block diagram illustrating an example fractional snapshot of a file system namespace according to one embodiment of the disclosure.

FIG. 2B depicts an example fractional snapshot 210 of the file system namespace 200. A request to create a fractional snapshot may include a list of collection partitions identifying the data-nodes (e.g., shadow M-Trees) that are to be included in the fractional snapshot. The meta-data node and each of the data-nodes identified by the list of collection partitions may be copied and stored as a snapshot of the state of those identified data-nodes. It should be noted that although three data-nodes are depicted, any number of data-nodes may be included in the file system namespace 200. Furthermore, any number of data-nodes of the file system namespace 200 may be included in the fractional snapshot.

Each of the collection partitions may identify a data-node of the file system namespace 200 and a location in storage of the identified data-node (e.g., shadow M-Tree). In one example, upon receiving a request to create a fractional snapshot, the file system may determine whether each of the data-nodes identified by the collection partitions are available. In one embodiment, if any of the data-nodes are unavailable, the snapshot is failed. In another embodiment, if a best-efforts flag for the snapshot is set, the fractional snapshot may be created for all available data-nodes identified by the list of collection partitions even if one or more of the storage nodes, and accordingly one or more of the data-nodes, is unavailable.

FIG. 3 is a flow diagram illustrating a process of creating a fractional snapshot of a file system namespace according to one embodiment of the invention. Process 300 may be performed by processing logic that includes hardware (e.g. circuitry, dedicated logic, etc.), software (e.g., embodied on a non-transitory computer readable medium), or a combination thereof. For example, process 300 may be performed by fractional snapshot module 125 of FIG. 1.

Referring to FIG. 3, the process begins at block 310, where processing logic receives a snapshot request to generate a fractional snapshot of a file system. The snapshot request may include an indication of a subset of data of the file system. The file system may include one or more data structures, such as M-Trees for storing and searching files. The indication of the subset of data may include a list of files, sets of files, data nodes, or any other file groupings or storage objects for the file system. In one example, the storage objects may be a collection partition identifying a shadow M-Tree of the file system. Each collection partition may identify the shadow M-Tree and a storage location of the shadow M-Tree. In one embodiment, the M-Trees are distributed across several storage nodes. As referred to herein, a local snapshot may be a snapshot created for an M-Tree, or other data object, at the local storage node of the M-Tree. A global snapshot may be the collection of all local snapshots of a particular snapshot. Each local snapshot may include an identifier of the global snapshot it is associated with.

At block 320, the processing logic may identify the subset of data of the file system indicated by the snapshot request. The processing logic may identify the subset of the data using the list of collection partitions (i.e., data objects). In one embodiment, the processing logic may determine if each of the collection partitions are online and available. If all collection partitions are available, the processing logic continues to block 330. Additionally, if processing logic determines that an indicator of a best-efforts mode is set, the processing logic may identify all available collection partitions from the request that are available.

At block 330, the processing logic may generate the fractional snapshot including the subset of data of the file system indicated by the snapshot request. In one embodiment, the processing logic determines whether each collection partition is available and generates the fractional snapshot of all available collection partitions that were included in the snapshot request. In one embodiment, the processing logic may determine whether a collection partition has been modified since the last snapshot of the collection partition. If a collection partition has not been modified, the snapshot for that collection partition can be skipped. For example, an auto-skip flag or other indicator may be set to a first value (e.g., "0") at the last snapshot and be updated to a second value upon being modified (e.g., "1"). The processing logic may then check the auto-skip flag prior to performing the snapshot to determine if the collection partition has been modified. Thus, collection partitions that have been modified may be included in the snapshot while the unmodified collection partitions are not. In one embodiment, if any of the collection partitions are not available the snapshot request may fail.

Figure 4A:
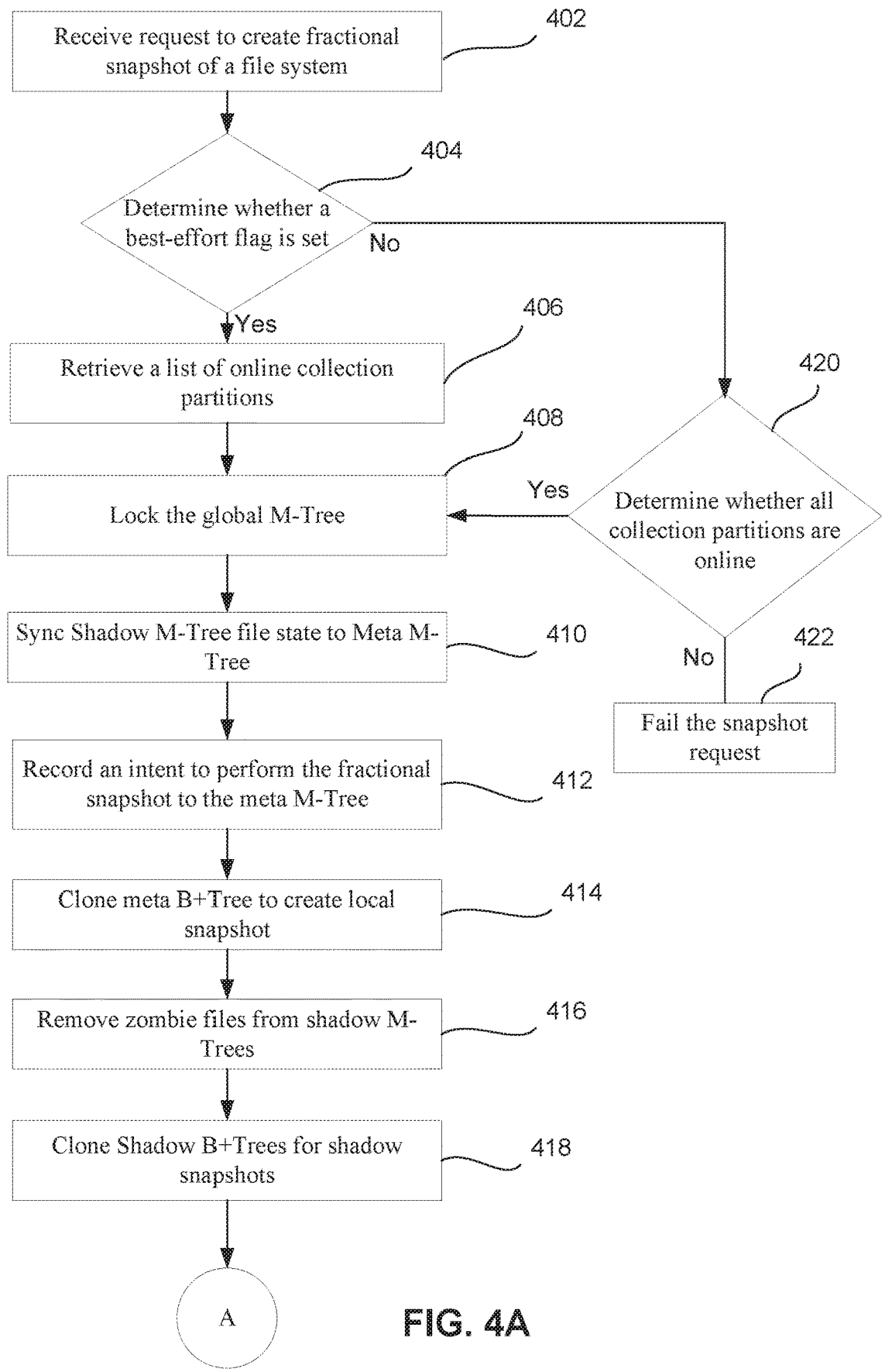
FIG. 4A is a flow diagram illustrating another example of creating a fractional snapshot, according to one embodiment of the disclosure.

FIG. 4A is a flow diagram illustrating a process of creating a fractional snapshot of a file system namespace according to one embodiment of the invention. Process 400 may be performed by processing logic that includes hardware (e.g. circuitry, dedicated logic, etc.), software (e.g., embodied on a non-transitory computer readable medium), or a combination thereof. For example, process 400 may be performed by fractional snapshot module 125 of FIG. 1.

Referring to FIG. 4A, the process begins at block 402 where processing logic receives a request to create a fractional snapshot. At block 404, the processing logic determines whether a best-efforts flag is set for the fractional snapshot of the file system. If the best-efforts flag is not set, the process continues to block 420 where the processing logic determines whether all collection partitions are online and at block 422, in response to determining that one or more of the collection partitions are not online, the processing logic fails the snapshot request.

At block 406, in response to determining that the best-efforts flag is set, the processing logic retrieves a list of online collection partitions. At block 408, the processing logic locks the global M-Tree for each of the collection partitions. For example, the processing logic may lock the global M-Tree from any further updates such as adding or updating a file and in progress data transfers. At block 410, the processing logic syncs the shadow M-Tree file states to the meta M-Tree. All pending syncs of the shadow M-Trees to the meta M-Tree are completed so that the full current state of the collection partitions can be persisted in the snapshot. It should be noted that although the example of an M-Tree of a DDFS is used with respect to FIGS. 4A-B and FIG. 5, any file system structure and file system management interface may be used in embodiments of the disclosure.

At block 412, the processing logic records an intent to perform the fractional snapshot to the meta M-Tree. The intent may also be written to persistent storage to ensure that the intent may be maintained even in the case of a system failure. The intent may be recorded to an intent log. Prior to starting any transaction consisting of a sequence of operations the intent is written to the intent log in persistent storage and is removed after completion of the sequence of operations.

At block 414, the processing logic clones the meta M-Tree to create a local snapshot of the meta M-Tree. The local snapshot of the meta M-Tree may include a copy of the intent recorded in the meta M-Tree at block 412. In one example, a counter corresponding to a next-snapshot ID field is incremented in the active meta M-Tree which will be the snapshot ID of the next snapshot created for the meta M-Tree. As referred to herein, a local snapshot may be a snapshot created for an M-Tree, or other data object, at the local storage node. A global snapshot may be the collection of all local snapshots of a particular snapshot. Each local snapshot may include an identifier of the global snapshot it is associated with.

At block 416, the processing logic removes any zombie files from the shadow M-Trees. A zombie file may be pending file deletion requests that are maintained on the meta M-Tree. A list of files that are deemed zombies may be forwarded from the meta M-Tree to the shadow M-Trees where the files are removed.

At block 418, the processing logic clones the shadow M-Trees identified by the list of collection partitions for the fractional snapshot. In one embodiment, the snapshots of the specified collection partitions are snapshotted in parallel with their snapshot ID being passed from the meta M-Tree.

Figure 4B:
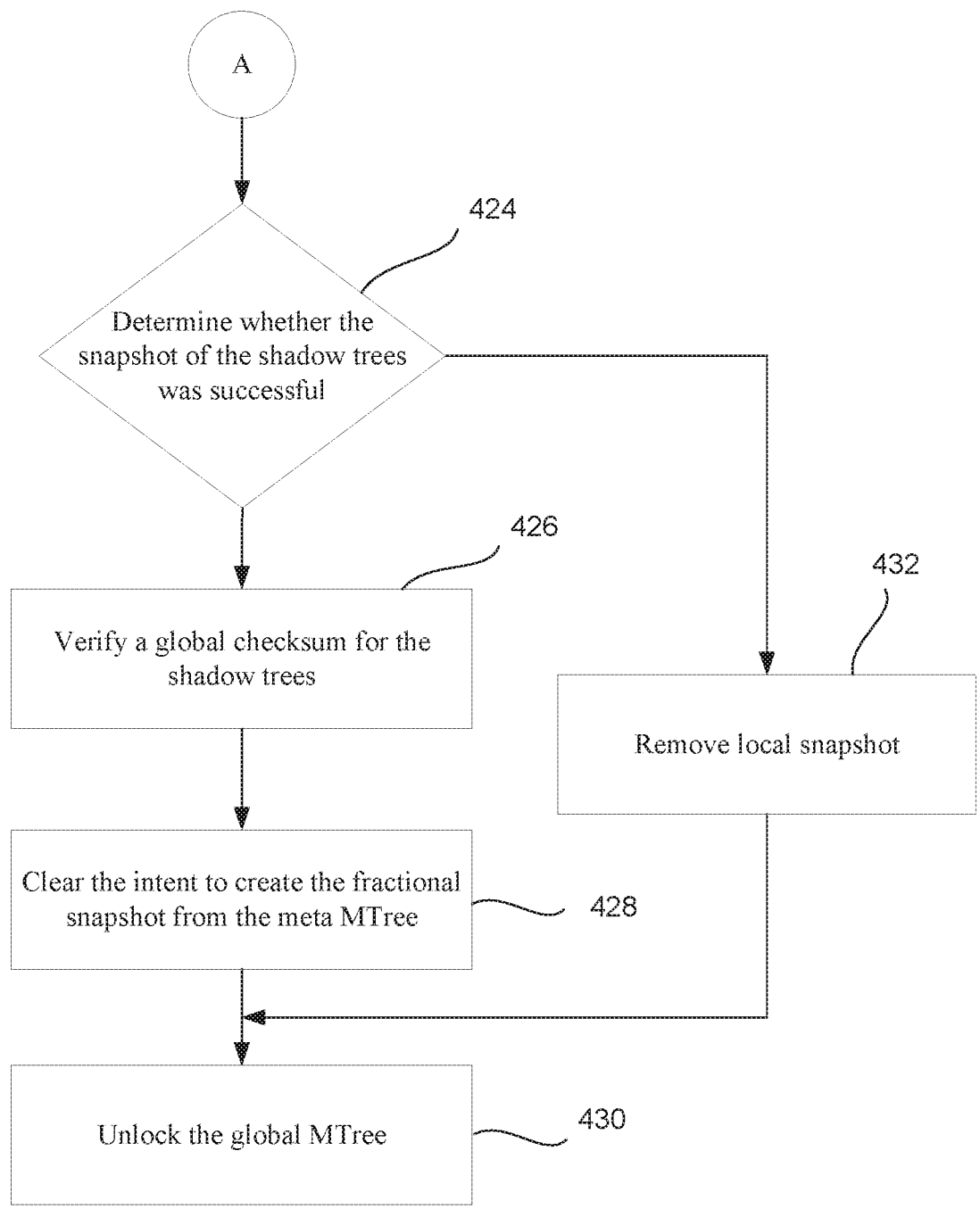
FIG. 4B is a flow diagram illustrating an example of confirming successful creation of a fractional snapshot.

Referring to FIG. 4B, process 400 continues to block 424 wherein processing logic determines whether the snapshot of the shadow trees was successful. At block 426, the processing logic verifies a global checksum for the shadow trees. The global checksum may be verified for all the shadow trees by comparing the global checksum across the snapshot with the checksum for the individual shadow M-Trees.

At block 428, the processing logic clears the intent to create the fractional snapshot from the meta M-Tree that was recorded at block 412. Clearing the intent may indicate that all sequential operations of the snapshot have been completed. At block 430, the processing logic unlocks the global M-Tree allowing further operations to be performed on the global M-Tree. At block 432, in response to determining that the snapshot of the shadow trees was not successful at block 424, the processing logic removes the local snapshot of the meta M-Tree and then continues to block 430 to unlock the global M-Tree.

In one embodiment, if the fractional snapshot fails in any way operations may be performed to clean up or recover from the failure. For example, if the snapshot of the meta M-Tree fails or produces an error, the snapshot of the meta M-Tree may be removed and the intent to perform the snapshot cleared prior to creating the snapshot for each of the collection partitions (e.g., shadow M-Trees). If the snapshot of the meta M-Tree succeeds but a remote snapshot of one of the shadow M-Trees fails, the snapshot of the meta M-Tree may be removed while the local snapshots of the shadow M-Trees may be removed at a later time (e.g., during routing garbage collection). In another example, during the next fractional snapshot attempt after a failed snapshot, if the intent from the prior attempt is detected, the processing logic may determine whether the snapshot of the meta M-Tree exists and then removes the snapshot of the meta M-Tree if found. The snapshots of the shadow M-Trees may then also be removed to allow creation of the next snapshot.

Figure 5:
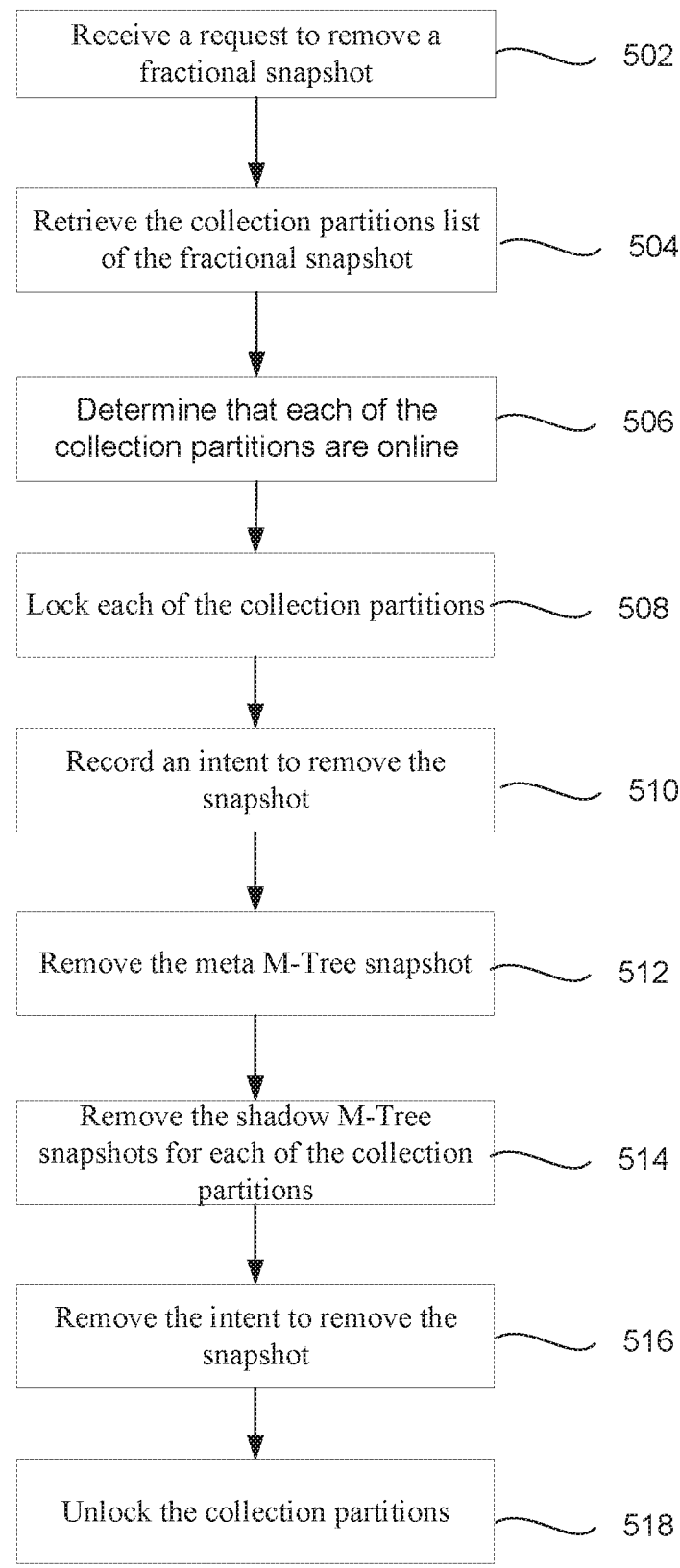
FIG. 5 is a flow diagram illustrating an example of removing a fractional snapshot from a file system namespace according to one embodiment.

FIG. 5 is a flow diagram illustrating a process of creating a fractional snapshot of a file system namespace according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by fractional snapshot module of FIG. 1.

Referring to FIG. 5, the process begins at block 502, receives a request to remove a fractional snapshot of a file system. At block 504, processing logic retrieves the collection partitions list of the fractional snapshot. For example, processing logic may perform a lookup on the fractional snapshot to obtain the list of collection partitions on which the fractional snapshot resides.

At block 506, processing logic determine that each of the collection partitions are online. If the collection partitions to be deleted are not online the operation may be failed. At block 508, the processing logic locks each of the collection partitions to prevent changes to the collection partitions during the removal of the fractional snapshot.

At block 510, the processing logic records an intent to remove the snapshot. The intent may be written to an intent log in persistent storage. At block 512, the processing logic removes the meta M-Tree snapshot from the file system. At block 514, the processing logic removes the shadow M-Tree snapshots for each of the collection partitions, and at block 516, the processing logic removes the intent to remove the snapshot. Finally, at block 518, the processing logic unlocks the collection partitions for continued operations.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
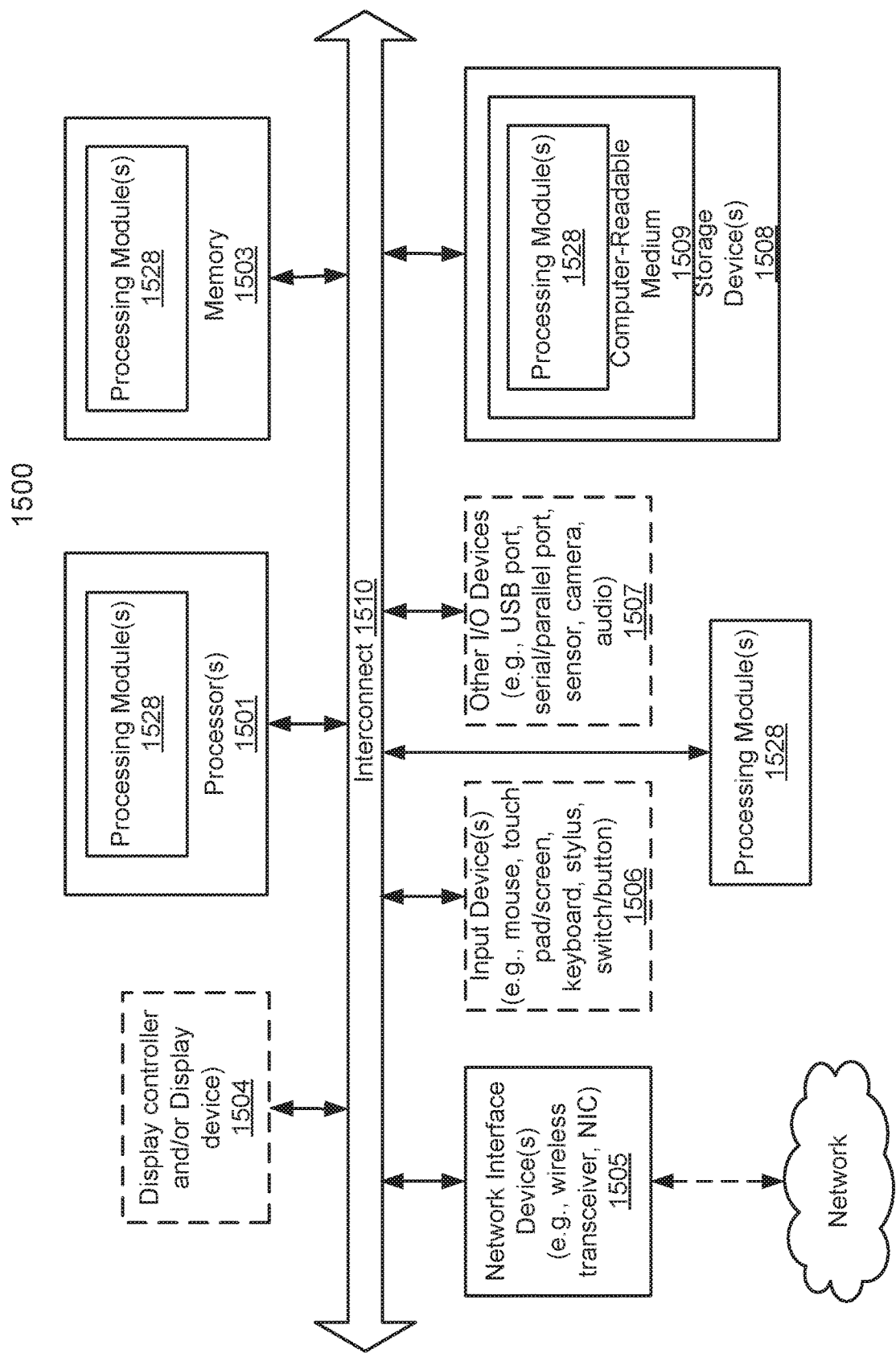
FIG. 6 is block diagram illustrating an example of a computing system that may be used in conjunction with one or more embodiments of the disclosure.

FIG. 6 is a block diagram illustrating an example of a data processing system which may be used with one embodiment of the invention. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a the fractional snapshot module 125 as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the same software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of capturing a fractional snapshot of a distributed file system, comprising:
   receiving a snapshot request to generate a fractional snapshot of a file system, the snapshot request comprising an indication of a subset of data of the file system, wherein the indication in the snapshot request comprises a list of storage objects, wherein each storage object includes a collection partition identifying a shadow M-Tree of the file system and a storage location of the shadow M-Tree;
   determining whether a best-efforts flag is set for the fractional snapshot of the file system;
   identifying, by a processing device, the subset of data of the file system indicated by the snapshot request in response to determining that the best-efforts flag is set; and
   generating, by the processing device, the fractional snapshot comprising the subset of data of the file system indicated by the snapshot request.

2. The method of claim 1, wherein the file system comprises one or more file sets and wherein the fractional snapshot comprises a subset of the one or more file sets.

3. The method of claim 2, wherein the indication of the subset of data comprises a list of storage objects, each storage object identifying a data node and storage location of a file set to be included in the fractional snapshot.

4. The method of claim 2, further comprising:
   receiving a request to remove the fractional snapshot;
   determining the file sets included in the fractional snapshot; and
   removing the fractional snapshot for each of the file sets of the fractional snapshot.

5. The method of claim 2, wherein generating the fractional snapshot comprises:
   determining whether each of the file sets are available; and
   generating the fractional snapshot with the file sets that are available.

6. The method of claim 5, wherein generating the fractional snapshot comprises:
   determining whether each of the file sets have been modified since a last snapshot; and
   generating the fractional snapshot on file sets that have been modified.

7. The method of claim 1, wherein the file system comprises a meta node and one or more data nodes, and wherein the fractional snapshot is generated for a subset of the one or more data nodes.

8. A system comprising:
   a memory; and
   a processing device operatively coupled to the memory, the processing device to perform operations comprising:
   receiving a snapshot request to generate a fractional snapshot of a file system, the snapshot request comprising an indication of a subset of data of the file system, wherein the indication in the snapshot request comprises a list of storage objects, wherein each storage object includes a collection partition identifying a shadow M-Tree of the file system and a storage location of the shadow M-Tree;
   determining whether a best-efforts flag is set for the fractional snapshot of the file system;
   identifying the subset of data of the file system indicated by the snapshot request in response to determining that the best-efforts flag is set; and
   generating the fractional snapshot comprising the subset of data of the file system indicated by the snapshot request.

9. The system of claim 8, wherein the file system comprises one or more file sets and wherein the fractional snapshot comprises a subset of the one or more file sets.

10. The system of claim 9, wherein the indication of the subset of data comprises a list of storage objects, each storage object identifying a data node and storage location of a file set to be included in the fractional snapshot.

11. The system of claim 9, further comprising:
    receiving a request to remove the fractional snapshot;
    determining the file sets included in the fractional snapshot; and
    removing the fractional snapshot for each of the file sets of the fractional snapshot.

12. The system of claim 9, wherein generating the fractional snapshot comprises:
    determining whether each of the file sets are available; and
    generating the fractional snapshot with the file sets that are available.

13. The system of claim 12, wherein generating the fractional snapshot comprises:
    determining whether each of the file sets have been modified since a last snapshot; and
    generating the fractional snapshot on file sets that have been modified.

14. The system of claim 8, wherein the file system comprises a meta node and one or more data nodes, and wherein the fractional snapshot is generated for a subset of the one or more data nodes.

15. A non-transitory machine-readable medium having instructions stored therein, which when executed by a processor, cause the processor to perform one or more operations, the operations comprising:
    receiving a snapshot request to generate a fractional snapshot of a file system, the snapshot request comprising an indication of a subset of data of the file system, wherein the indication in the snapshot request comprises a list of storage objects, wherein each storage object includes a collection partition identifying a shadow M-Tree of the file system and a storage location of the shadow M-Tree;
    determining whether a best-efforts flag is set for the fractional snapshot of the file system;

identifying, by a processing device, the subset of data of the file system indicated by the snapshot request in response to determining that the best-efforts flag is set; and generating, by the processing device, the fractional snapshot comprising the subset of data of the file system indicated by the snapshot request.

16. The non-transitory machine-readable medium of claim 15, wherein the file system comprises one or more file sets and wherein the fractional snapshot comprises a subset of the one or more file sets.

17. The non-transitory machine-readable medium of claim 16, wherein the indication of the subset of data comprises a list of storage objects, each storage object identifying a data node and storage location of a file set to be included in the fractional snapshot.

18. The non-transitory machine-readable medium of claim 16, further comprising:
receiving a request to remove the fractional snapshot;
determining the file sets included in the fractional snapshot; and
removing the fractional snapshot for each of the file sets of the fractional snapshot.

19. The non-transitory machine-readable medium of claim 16, wherein generating the fractional snapshot comprises:
determining whether each of the file sets are available; and
generating the fractional snapshot with the file sets that are available.

20. The non-transitory machine-readable medium of claim 19, wherein generating the fractional snapshot comprises:
determining whether each of the file sets have been modified since a last snapshot; and
generating the fractional snapshot on file sets that have been modified.

* * * * *